United States Patent
Helmick et al.

(10) Patent No.: US 12,353,747 B2
(45) Date of Patent: Jul. 8, 2025

(54) PREPOPULATING COMMANDS AT A STORAGE DEVICE FOR ACCELERATED HOST-ISSUED LIVE MIGRATION OF STORAGE DATA

(71) Applicant: Samsung Electronics Co., Ltd., Suwon-si (KR)

(72) Inventors: Daniel Lee Helmick, Broomfield, CO (US); Chun-Chu Chen-Jhy Archie Wu, San Carlos, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 54 days.

(21) Appl. No.: 18/154,755

(22) Filed: Jan. 13, 2023

(65) Prior Publication Data

US 2024/0160372 A1 May 16, 2024

Related U.S. Application Data

(60) Provisional application No. 63/425,937, filed on Nov. 16, 2022.

(51) Int. Cl.
*G06F 3/06* (2006.01)

(52) U.S. Cl.
CPC .......... *G06F 3/0647* (2013.01); *G06F 3/0604* (2013.01); *G06F 3/0659* (2013.01); *G06F 3/067* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20;

(Continued)

(56) References Cited

U.S. PATENT DOCUMENTS 7,739,432 B1 * 6/2010 Shaw ................... G06F 13/4022
                                                                 360/44
8,122,177 B1 * 2/2012 Puranik ................... G06F 13/28
                                                                 710/316

(Continued)

OTHER PUBLICATIONS

Definition of "range"; Merriam-Webster Online Dictionary; Feb. 15, 2022; retrieved from https://web.archive.org/web/20220215210125/https://www.merriam-webster.com/dictionary/range on Apr. 30, 2024 (Year: 2022).*

(Continued)

*Primary Examiner* — Daniel C. Chappell
(74) *Attorney, Agent, or Firm* — Lewis Roca Rothgerber Christie LLP

(57) ABSTRACT

Provided is a method for managing a data migration operation, including creating, by a storage device, a read submission queue entry indicating a location of data at a source storage of the storage device to be copied from the source storage to a target storage, the read submission queue entry including a field including metadata including information for reading the data from the source storage.

18 Claims, 8 Drawing Sheets

(58) Field of Classification Search
CPC ........ G06F 2209/00–549; G06F 2211/00–902;
G06F 2212/00–7211; G06F
2213/00–4004; G06F 2216/00–17; G06F
2221/00–2153; G06N 3/00–126; G06N
5/00–048; G06N 7/00–08; G06N 10/00;
G06N 20/00–20; G06N 99/00–007; G06T
1/00–60; G06V 30/00–43; G11B
20/00–24; G11B 33/00–1493; G11C
11/00–5692; G11C 13/00–06; G11C
14/00–009; G11C 15/00–06; G11C
16/00–3495; G11C 17/00–18; G11C
2207/00–229; G11C 2216/00–30; H01L
25/00–50; H01L 2225/00–1094; H03M
7/00–707; H04L 9/00–38; H04L
12/00–66; H04L 41/00–5096; H04L
49/00–9094; H04L 61/00–59; H04L
67/00–75
See application file for complete search history.

(56) References Cited

U.S. PATENT DOCUMENTS

| | | | | |
|---|---|---|---|---|
| 8,271,700 | B1 * | 9/2012 | Annem | G06F 13/28 |
| | | | | 710/22 |
| 8,595,385 | B1 * | 11/2013 | Shapiro | G06F 13/385 |
| | | | | 710/52 |
| 9,213,721 | B1 * | 12/2015 | Faibish | G06F 16/185 |
| 9,378,049 | B1 * | 6/2016 | Johnson | G06F 9/45558 |
| 10,466,903 | B2 | 11/2019 | Benisty et al. | |
| 10,521,137 | B1 * | 12/2019 | Xu | G06F 3/0619 |
| 10,606,516 | B2 * | 3/2020 | Subraya | G06F 12/0246 |
| 10,635,355 | B1 * | 4/2020 | Helmick | G06F 3/0688 |
| 10,810,123 | B1 * | 10/2020 | Xu | G06F 12/0804 |
| 10,970,235 | B2 * | 4/2021 | Hong | G06F 13/1642 |
| 10,997,093 | B2 * | 5/2021 | Chang | G06F 3/0611 |
| 11,200,172 | B2 * | 12/2021 | Okada | G06F 12/1441 |
| 11,354,057 | B2 * | 6/2022 | Kim | G06F 13/1668 |
| 11,372,785 | B2 * | 6/2022 | Makhervaks | G06F 13/1673 |
| 11,604,594 | B2 * | 3/2023 | Narayanan | G06F 3/0647 |
| 11,675,633 | B2 * | 6/2023 | Manula | H04L 67/1095 |
| | | | | 719/311 |
| 11,698,881 | B2 * | 7/2023 | Haimzon | G06F 3/0688 |
| | | | | 710/308 |
| 11,880,580 | B1 * | 1/2024 | Shem Tov | G06F 3/067 |
| 11,997,024 | B2 * | 5/2024 | L'Ecuyer | G06F 3/061 |
| 12,093,559 | B2 * | 9/2024 | Mane | G06F 3/0673 |
| 2010/0235831 | A1 * | 9/2010 | Dittmer | G06F 9/45558 |
| | | | | 718/1 |
| 2012/0131253 | A1 * | 5/2012 | McKnight | G06F 13/1668 |
| | | | | 710/308 |
| 2013/0151804 | A1 * | 6/2013 | Alatorre | G06F 3/0647 |
| | | | | 711/170 |
| 2014/0173017 | A1 * | 6/2014 | Takagi | G06F 3/067 |
| | | | | 709/213 |
| 2014/0207991 | A1 * | 7/2014 | Kaushik | G06F 13/4282 |
| | | | | 455/418 |
| 2015/0046625 | A1 * | 2/2015 | Peddle | G11C 14/0018 |
| | | | | 710/308 |
| 2015/0113407 | A1 * | 4/2015 | Hoffert | H04N 21/482 |
| | | | | 715/720 |
| 2019/0005106 | A1 * | 1/2019 | Kalach | G06F 11/2094 |
| 2019/0146482 | A1 * | 5/2019 | Cella | H04W 4/38 |
| | | | | 702/188 |
| 2019/0250845 | A1 * | 8/2019 | Kabra | G06F 13/1673 |
| 2020/0042192 | A1 * | 2/2020 | Gerhart | G06F 12/0879 |
| 2020/0225874 | A1 * | 7/2020 | Nimmagadda | G06F 15/17331 |
| 2021/0019270 | A1 * | 1/2021 | Li | G06F 13/1668 |
| 2021/0103445 | A1 * | 4/2021 | Schauer | G06F 9/3004 |
| 2021/0263762 | A1 * | 8/2021 | Kachare | G06F 12/0868 |
| 2022/0011981 | A1 | 1/2022 | Kanno | |
| 2022/0019365 | A1 * | 1/2022 | Narayanan | G06F 3/0673 |
| 2022/0156001 | A1 | 5/2022 | Anandan et al. | |
| 2022/0236902 | A1 * | 7/2022 | Pinto | G06F 3/0644 |

OTHER PUBLICATIONS

E. C. Lee, J. Rho, B. J. Lee and H. Kang, "Heat Dissipation Analysis of M.2 NVMe Solid-State Drive in Vacuum," 2019 International Vacuum Electronics Conference (IVEC), Busan, Korea (South), 2019, pp. 1-2, doi: 10.1109/IVEC.2019.8744950. keywords: {M.2 solid-state drive;vacuum;heat dissipation}, (Year: 2019).*
NVM-Express-NVM-Command-Set-Specification—Jun. 2, 2021—Ratified(Jun. 29, 2022), 105 pages.
NVM-Express-Base-Specification-2_0—Jun. 2, 2021—Ratified—4(Jun. 29, 2022), 452 pages.
EPO Extended European Search Report dated Mar. 14, 2024, issued in corresponding European Patent Application No. 23207941.8 (10 pages).

* cited by examiner

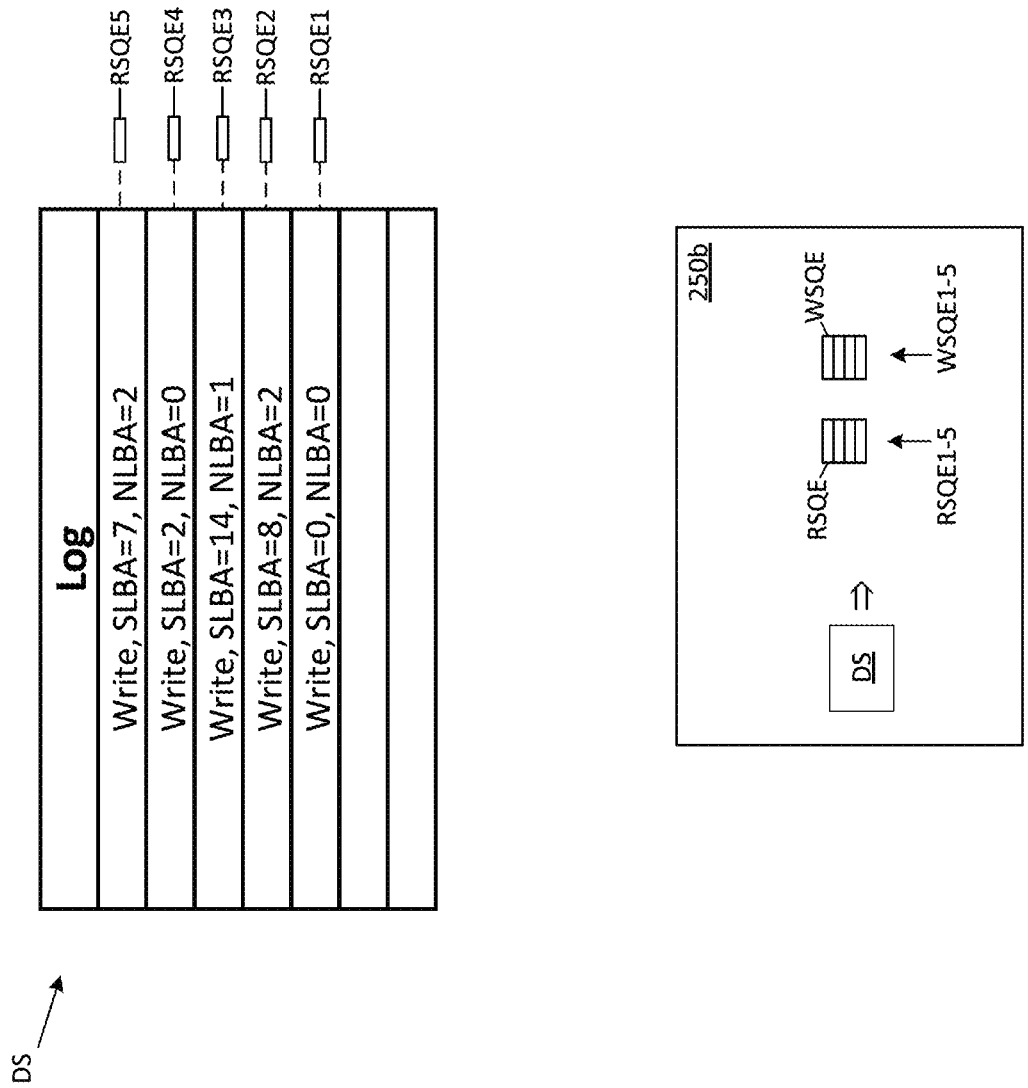

FIG. 3C

RSQE

| Read Command | Bit | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| DWORD 0 | OpCode | | | | | | | | Fused | | | | | | PRP/SGL | |
| | Cmd ID | | | | | | | | | | | | | | | |
| DWORD 1 | NS ID | | | | | | | | | | | | | | | |
| DWORD 2 | ELBST/EILBRT | | | | | | | | | | | | | | | |
| DWORD 3 | | | | | | | | | | | | | | | | |
| DWORD 4 | MD   Metadata Pointer | | | | | | | | | | | | | | | |
| DWORD 5 | | | | | | | | | | | | | | | | |
| DWORD 6 | PRP1 or SGL1     PRP Entry 1 (or SGL part 1) | | | | | | | | | | | | | | | |
| DWORD 7 | | | | | | | | | | | | | | | | |
| DWORD 8 | PRP2 or SGL2     PRP Entry 2 (or SGL part 2) | | | | | | | | | | | | | | | |
| DWORD 9 | | | | | | | | | | | | | | | | |
| DWORD 10 | SLBA   Starting LBA | | | | | | | | | | | | | | | |
| DWORD 11 | | | | | | | | | | | | | | | | |
| DWORD 12 | NLBA   Number of LBAs | | | | | | | | | | | | | | | |
| DWORD 13 | Dataset Mgmt | | | | | | | | STC | | | | PRINFO | | FUA | LR |
| DWORD 14 | ELBST/EILBRT | | | | | | | | | | | | | | | |
| DWORD 15 | ELBAT | | | | | | | | | | | | | | | |
| | ELBATM | | | | | | | | | | | | | | | |

FIG. 3D

WSQE ↓

| Write Command | Bit | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| DWORD 0 | | | OpCode | | | | | | Fused | | | | | | PRP/SGL | |
| | Cmd ID | | | | | | | | | | | | | | | |
| DWORD 1 | NS ID | | | | | | | | | | | | | | | |
| DWORD 2 | LBST/ILBRT | | | | | | | | | | | | | | | |
| DWORD 3 | | | | | | | | | | | | | | | | |
| DWORD 4 | MD   Metadata Pointer | | | | | | | | | | | | | | | |
| DWORD 5 | | | | | | | | | | | | | | | | |
| DWORD 6 | PRP1 or SGL1   PRP Entry 1 (or SGL part 1) | | | | | | | | | | | | | | | |
| DWORD 7 | | | | | | | | | | | | | | | | |
| DWORD 8 | PRP2 or SGL2   PRP Entry 2 (or SGL part 2) | | | | | | | | | | | | | | | |
| DWORD 9 | | | | | | | | | | | | | | | | |
| DWORD 10 | SLBA   Starting LBA | | | | | | | | | | | | | | | |
| DWORD 11 | | | | | | | | | | | | | | | | |
| DWORD 12 | NLBA   Number of LBAs | | | | | | | | | | | | | | | |
| DWORD 13 | Dataset Mgmt | | | | | Directive Type | | | STC | | | | PRINFO | | FUA | LR |
| | Directive Specific | | | | | | | | | | | | | | | |
| DWORD 14 | LBST/ILBRT | | | | | | | | | | | | | | | |
| DWORD 15 | LBAT | | | | | | | | | | | | | | | |
| | LBATM | | | | | | | | | | | | | | | |

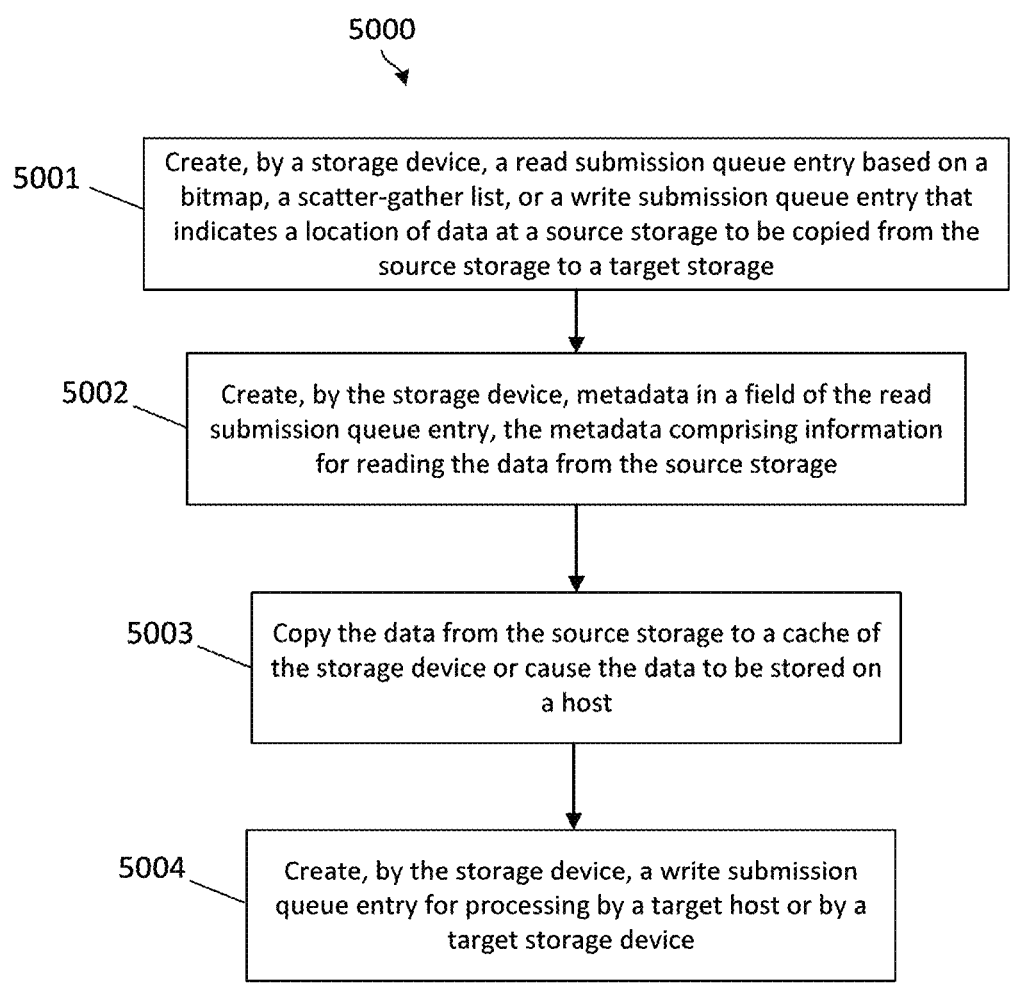

PREPOPULATING COMMANDS AT A STORAGE DEVICE FOR ACCELERATED HOST-ISSUED LIVE MIGRATION OF STORAGE DATA

CROSS-REFERENCE TO RELATED APPLICATION(S)

This application claims priority to, and benefit of, U.S. Provisional Application Ser. No. 63/425,937, filed on Nov. 16, 2022, entitled "PRE-POPULATING READ COMMANDS FOR ACCELERATED HOST ISSUED LIVE MIGRATION OF STORAGE DATA," the entire content of which is incorporated herein by reference.

FIELD

One or more aspects of one or more embodiments according to the present disclosure relate to systems and methods for data storage.

BACKGROUND

The present background section is intended to provide context only, and the disclosure of any embodiment or concept in this section does not constitute an admission that said embodiment or concept is prior art.

In the field of data storage, a live migration operation (or live migration process) may refer to a migration operation or migration process, wherein data (e.g., storage data) is copied from one storage to another (e.g., from a source storage to a target storage) at a time when the source storage may potentially receive user data reads or user data writes (e.g., the source storage is live) from a source server. As used herein, a "live migration" component (e.g., "live migration server" or "live migration storage device," etc.) refers to a component that may be involved with the transfer of data from the source storage to the target storage and that may have higher/additional privileges (e.g., higher/additional privileges to access data within the system) than other components of the system.

Data structures may be used to track locations of data within the source storage to be copied to the target storage. Although metadata associated with the data structures is relatively small when compared to the storage capacity of a storage device, the operation of processing the data structures may consume relatively significant host-processing resources. For example, the host may process the metadata of the data structures to create commands (e.g., submission queue entries (SQEs)) for extracting the data out of the source storage for live migration.

Accordingly, there may be methods, devices, and systems that are suitable for improving the communication of metadata for managing or performing a data migration (e.g., a live migration).

SUMMARY

Aspects of one or more embodiments of the present disclosure relate to computer storage systems, and provide improvements to systems and methods for processing submission queue entries for managing a data migration.

According to one or more embodiments of the present disclosure, there is provided a method for managing a data migration operation, including creating, by a storage device, a read submission queue entry indicating a location of data at a source storage of the storage device to be copied from the source storage to a target storage, the read submission queue entry including a field including metadata including information for reading the data from the source storage.

The method may further include sending, by the storage device, the read submission queue entry to a host, receiving, by the storage device, a command based on the read submission queue entry, and reading, by the storage device, the data from the source storage based on the command.

The method may further include reading the data from the source storage based on the read submission queue entry being stored on the storage device.

The field of the read submission queue entry may be one entry of multiple entries of the read submission queue entry, and the entries may include information for reading the data from the source storage.

The metadata may include a data pointer or a command identifier.

The read submission queue entry may be created using information from a write submission queue entry corresponding to a user data write.

The method may further include generating a scatter-gather list or a bitmap based on a user data write received in the source storage, wherein the read submission queue entry is created based on the scatter-gather list or the bitmap.

The method may further include copying, by the storage device, the data from the source storage to a cache of the storage device, or causing the data to be stored on a host.

The method may further include creating, by the storage device, a write submission queue entry for processing by a target live migration server or by a target live migration storage device.

According to one or more other embodiments of the present disclosure, there is provided a storage device for managing a data migration operation, the storage device being configured to create a read submission queue entry indicating a location of data at a source storage of the storage device to be copied from the source storage to a target storage, the read submission queue entry including a field including metadata including information for reading the data from the source storage.

The field of the read submission queue entry may be one entry of multiple entries of the read submission queue entry, and the entries may include information for reading the data from the source storage.

The metadata may include a data pointer or a command identifier.

The read submission queue entry may be created using information from a write submission queue entry corresponding to a user data write.

The storage device may be configured to generate a scatter-gather list or a bitmap based on a user data write received in the source storage, and create the read submission queue entry based on the scatter-gather list or the bitmap.

The storage device may be configured to create a write submission queue entry for processing by a target live migration server or by a target live migration storage device.

According to one or more other embodiments of the present disclosure, there is provided a system for managing a data migration operation, including a host, and a storage device, wherein the storage device is configured to create a read submission queue entry indicating a location of data at a source storage of the storage device to be copied from the source storage to a target storage, the read submission queue entry including a field including metadata including information for reading the data from the source storage.

The storage device may be configured to send the read submission queue entry to the host, receive a command based on the read submission queue entry, and read the data from the source storage based on the command.

The storage device may be configured to read the data from the source storage based on the read submission queue entry being stored on the storage device.

The read submission queue entry may be created using information from a write submission queue entry corresponding to a user data write.

The storage device may be configured to create a write submission queue entry for processing by a target live migration server or by a target live migration storage device.

BRIEF DESCRIPTION OF THE DRAWINGS

Nonlimiting and non-exhaustive embodiments of the present disclosure are described with reference to the following figures, wherein like reference numerals refer to like parts throughout the various views unless otherwise specified.

FIG. 3B is a diagram depicting a data structure that is a scatter-gather list, according to one or more embodiments of the present disclosure.

FIG. 3C is a diagram depicting fields of a read submission queue entry, according to one or more embodiments of the present disclosure.

FIG. 3D is a diagram depicting fields of a write submission queue entry, according to one or more embodiments of the present disclosure.

FIG. 5 is a flowchart depicting example operations of methods for managing a data migration using a live migration storage device to create submission queue entries, according to one or more embodiments of the present disclosure.

Figure 1:
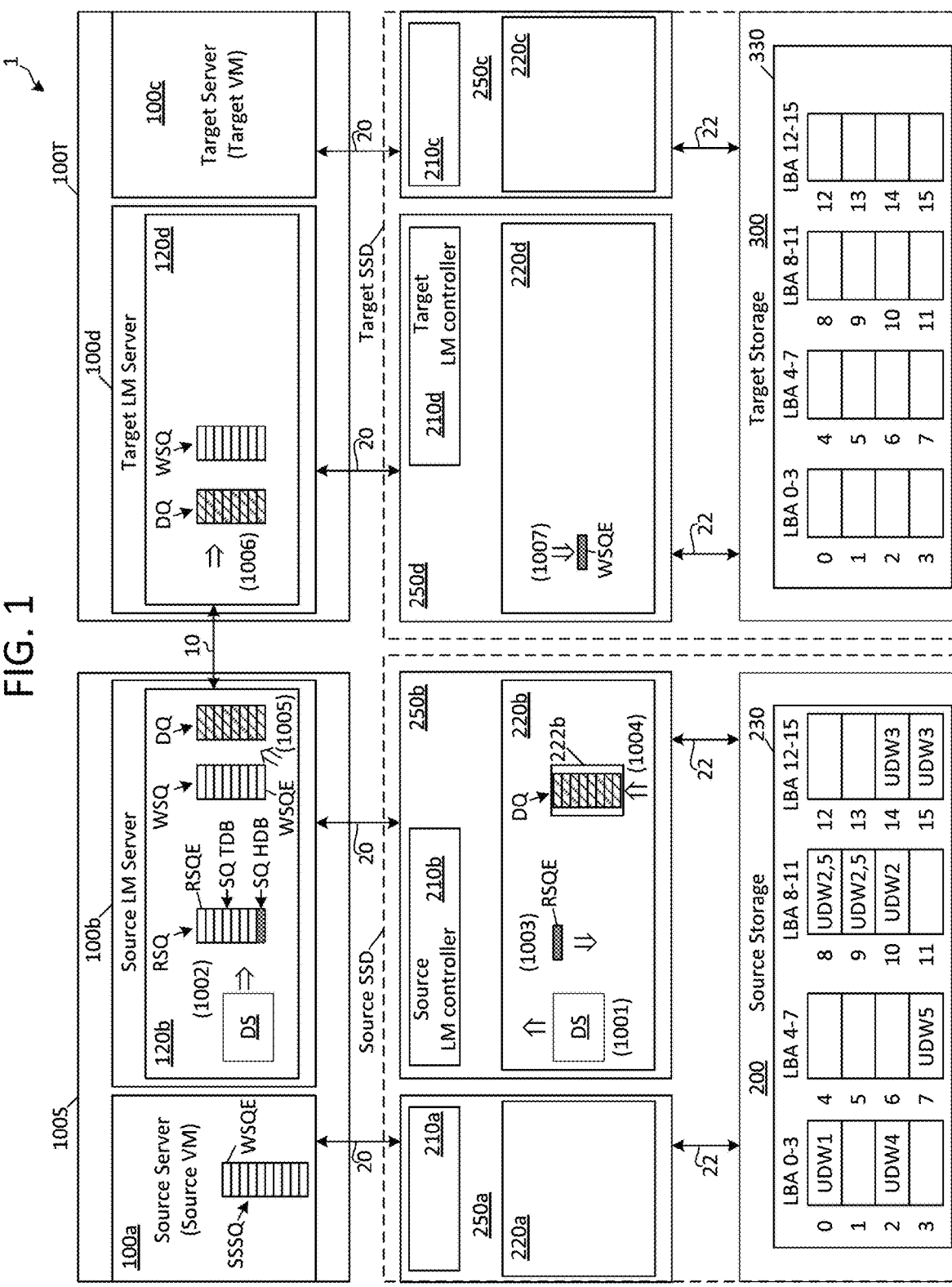
FIG. 1 is a system diagram depicting a system for managing a data migration using a live migration server to create submission queue entries, according to one or more embodiments of the present disclosure.

Corresponding reference characters indicate corresponding components throughout the several views of the drawings. Skilled artisans will appreciate that elements in the figures are illustrated for simplicity and clarity, and have not necessarily been drawn to scale. For example, the dimensions of some of the elements and regions in the figures may be exaggerated relative to other elements and regions to help to improve clarity and understanding of various embodiments. Also, common but well-understood elements and parts not related to the description of the embodiments might not be shown to facilitate a less obstructed view of these various embodiments and to make the description clear.

DETAILED DESCRIPTION

Aspects of the present disclosure and methods of accomplishing the same may be understood more readily by reference to the detailed description of one or more embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey aspects of the present disclosure to those skilled in the art. Accordingly, description of processes, elements, and techniques that are not necessary to those having ordinary skill in the art for a complete understanding of the aspects and features of the present disclosure may be omitted.

Unless otherwise noted, like reference numerals, characters, or combinations thereof denote like elements throughout the attached drawings and the written description, and thus, descriptions thereof will not be repeated. Further, parts not related to the description of the embodiments might not be shown to make the description clear. In the drawings, the relative sizes of elements and regions may be exaggerated for clarity.

In the detailed description, for the purposes of explanation, numerous specific details are set forth to provide a thorough understanding of various embodiments. It is apparent, however, that various embodiments may be practiced without these specific details or with one or more equivalent arrangements.

It will be understood that, although the terms "zeroth," "first," "second," "third," etc., may be used herein to describe various elements, components, regions, and/or sections, these elements, components, regions, and/or sections should not be limited by these terms. These terms are used to distinguish one element, component, region, or section from another element, component, region, or section. Thus, a first element, component, region, or section described below could be termed a second element, component, region, or section, without departing from the spirit and scope of the present disclosure.

It will be understood that when an element or component is referred to as being "on," "connected to," or "coupled to" another element or component, it can be directly on, connected to, or coupled to the other element or component, or one or more intervening elements or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or component is referred to as being "between" two elements or components, it can be the only element or component between the two elements or components, or one or more intervening elements or components may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, each of the terms "or" and "and/or" includes any and all combinations of one or more of the associated listed items.

For the purposes of this disclosure, expressions such as "at least one of," when preceding a list of elements, modify the entire list of elements and do not modify the individual elements of the list. For example, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

Any of the components or any combination of the components described (e.g., in any system diagrams included herein) may be used to perform one or more of the operations of any flow chart included herein. Further, (i) the operations are merely examples, and may involve various additional operations not explicitly covered, and (ii) the temporal order of the operations may be varied.

The electronic or electric devices and/or any other relevant devices or components according to embodiments of the present disclosure described herein may be implemented using any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random-access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

As mentioned above, in the field of data storage, a live migration operation, or live migration process, may refer to an operation or process of copying data (e.g., storage data) from a source storage to a target storage, in what may be called a migration process, at a time when the source storage may potentially receive a user data read or user data write (e.g., at a time the source storage is live) from a source server (e.g., from a host that may be assigned lower supervising privileges than a hypervisor (or live migration server)).

For example, a data center owner, operator, and/or a software platform operator selling compute resources may implement a live migration strategy, wherein data may be moved from a source storage to a new, target storage at a time when the data at the source storage may be changed (e.g., at a time when the data at the source storage may be updated based on the reception of user data writes). A live migration strategy may involve moving a namespace (e.g., a grouping of objects in a storage) from a source controller/storage to a target controller/storage.

Data structures, such as bitmaps and/or scatter-gather lists (e.g., a list of vectors, each of which gives the location and length of one segment in the overall read or write request), may be used to track locations of data within the source storage to be copied to the target storage. For example, an entire source storage drive, which may have a large storage capacity (e.g., 8 terabytes (TB)), may have each logical block address/LBA (e.g., 4 kilobytes (KB)) represented by a significantly smaller size of tracking metadata, in one or more data structures, to indicate whether a corresponding LBA includes data that should be copied from the source storage to the target storage.

As will be discussed in further detail below with reference to the figures, a live migration controller (e.g., a source live migration controller) may assist a live migration server (e.g., a source live migration server) in management of a live migration operation by creating the tracking metadata. For example, generating the tracking metadata may include the creation of data structures (e.g., bitmaps or scatter-gather lists), which are temporary communication mechanisms, used to identify locations of user data writes that are written within the source storage during a time period in which a first iteration of an instance of copying data from the source storage to the target storage occurs. That is, a user data write, which was received at a location of the source storage containing data that was previously copied from the source storage to the target storage, may cause the source storage data to change.

For example, locations in the source storage (e.g., LBAs) corresponding to user data writes causing the source storage data to change may be called "dirty pages" containing "dirty data." The live migration controller may track the locations of dirty pages with data structures, and may send the data structures to a live migration server to copy the dirty data from the source storage to a target storage in a next iteration of copying (e.g., to update the data in the target storage with the current/more recent data in the source storage).

Although the metadata associated with the data structures is relatively small in comparison to the storage capacity of a storage device, processing the data structures may consume significant host-processing resources. For example, the host may process the metadata of the data structures to create commands (e.g., SQEs). The SQEs may include read SQEs associated with read commands to be sent to the live migration storage device to extract the data from the source storage for live migration. The SQEs may also include write SQEs associated with write commands to be sent to the target storage for writing the data extracted from the source storage to the target storage. In processing a data structure to create an SQE, the live migration server may perform redundant steps of parsing into a data structure, and then may back out of the data structure.

A system for managing a live migration according to the present disclosure may use a source live migration storage device to create and prepopulate SQEs (e.g., read commands, write commands, etc.), thereby improving overall system performance by removing the workload associated with creating and populating the SQEs from a source live migration server, and by shifting the workload to the source live migration storage device. By creating and prepopulating one or more fields of the SQEs at the source live migration storage device, a storage system may achieve faster read performance of live migration data, thereby resulting in a faster overall data migration.

In one or more embodiments, the source live migration storage device may read the data from the source storage based on reception of an SQE, which was created and prepopulated by the source live migration storage device, from the source live migration server. For example, the source live migration server may (i) finish populating the fields of the SQE that were left unpopulated by the source live migration storage device when creating the SQE and/or (ii) overwrite some of the fields of the SQE that were prepopulated by the source live migration storage device when creating the SQE.

In one or more other embodiments, instead of the source live migration storage device creating and sending an SQE to the source live migration server and thereafter waiting to receive a command from the source live migration server, the source live migration storage device may have sufficient information from the SQE to retrieve the data from the source storage automatically (e.g., without waiting to receive the command from the source live migration server).

In one or more embodiments, instead of the source live migration storage device creating the data structure in the form of a bitmap or in the form of a scatter-gather list, the source live migration storage device may use a write SQE corresponding to a source server submission queue (and corresponding user data write) to generate SQEs. For example, the source live migration storage device may be configured to convert write SQEs, which correspond to dirty pages, to read SQEs. For example, the source live migration storage device may be configured to extract metadata from one or more fields of a write SQE to prepopulate one or more fields of a corresponding read SQE.

In one or more embodiments, the source live migration storage device may store dirty data copied from the source storage in a cache of the source live migration storage device. For example, the source live migration storage device may create a data queue on the storage device, and may send the data queue to the source live migration server at a later time (e.g., asynchronously).

In one or more embodiments, the source live migration storage device may store dirty data copied from the source storage to a buffer on the source live migration server. For example, the source live migration storage device may create the data queue on the source live migration server. In one or more embodiments, the location (or locations) of the data queue may be used (e.g., identified) in both the read SQE coming out of the source and the write SQE for the target. If the write SQE is filled out (e.g., prepopulated), the target live migration server may set up a matching memory address range for copying the data queue between the source live migration server and the target live migration server.

In one or more embodiments, the source live migration storage device may also create write SQEs for processing by a target live migration sever or a target live migration storage device in writing the data to the target storage.

FIG. 1 is a system diagram depicting a system 1 for managing a data migration using a source live migration server 100b to create submission queue entries (SQEs), according to one or more embodiments of the present disclosure.

Referring to FIG. 1, the system 1 may include a source host system 100S and a target host system 100T. The source host system 100S may be connected to a source storage 200. The target host system 100T may be connected to a target storage 300. The source host system 100S and the target host system 100T may be associated with, or may include, central processing units (CPUs). The source storage 200 and the target storage 300 may include logical block addresses (LBAs) (e.g., LBA 0 to LBA 15, as depicted within the source storage 200 in FIG. 1 for a simplified example). The LBAs may be associated with physical locations in the source storage 200 and in the target storage 300 for storing data (e.g., user data).

The target host system 100T may include a target server 100c (e.g., a target virtual machine (VM)). The target server 100c may be connected to a target storage device 250c via a communications link 20. The communications link 20 may include, or may be implemented by way of, a variety of technologies (e.g., peripheral component interconnect express (PCIe), nonvolatile memory express (NVMe) over PCIe, NVMe over Fabrics (NVMe-oF), etc.).

The target storage device 250c may include a target storage controller 210c and a target controller memory 220c. The target controller memory 220c may include, or may be, RAM (e.g., static random-access memory (SRAM) or dynamic random-access memory (DRAM)). The target storage controller 210c may include, or may be implemented by way of, embedded logic. The embedded logic may be embedded within the target storage device 250c. The embedded logic may enable the target storage controller 210c to handle requests from a server (e.g., the target server 100c) to copy/write data to the target storage 300.

The target storage device 250c may include the target storage 300 (or a portion of the target storage 300). For example, the target storage 300 may include a target memory 330. The target memory 330 may include, or may be, a long-term memory. For example, the target memory 330 may include a nonvolatile memory and/or a memory tier (including volatile and nonvolatile memory), and may correspond to long-term memory devices of one or more target storage devices 250c. For example, the target storage 300 may refer to a long-term memory made up of one or more target storage devices 250c of a distributed storage system (e.g., a virtualized distributed storage system). The target storage device 250c may be a solid-state drive (SSD) including one or more underlying target storage devices 250c, which may be virtual or physical. The target storage device 250c may be connected to the target storage 300 via a storage interface 22. The storage interface 22 may include, or may be, a flash interface (e.g., a NAND flash interface) or a remote interface (e.g., an interface that is implemented by way of ethernet).

The source host system 100S may include a source server 100a. The source server 100a may be a host, or may be a source VM. The source server 100a may serve read and write requests from a user application. For example, a user may use an application (e.g., a word-processing application) to send a user data write UDW (e.g., a user application data write request) or a user data read UDR (e.g., a user application data read request) to the source storage 200. The read/write requests may be sent to the source storage 200 via the source storage device 250a. The write requests from the source server 100a may be queued at the source server 100a, prior to being sent to the source storage 200, in a source server submission queue SSSQ including one or more write submission queue entries WSQE. Similarly, in one or more embodiments, the read requests from the source server 100a may be queued at the source server 100a, prior to being sent to the source storage 200, in a source server submission queue including one or more read submission queue entries.

The source server 100a may be connected to a source storage device 250a via a communications link 20. The communications link 20 may include, or may be implemented by way of, a variety of technologies (e.g., PCIe, NVMe over PCIe, NVMe-oF, etc.).

The source storage device 250a may include a source storage controller 210a and a source controller memory 220a. The source controller memory 220a may include, or may be, RAM (e.g., SRAM or DRAM). The source storage controller 210a may include, or may be implemented by way of, embedded logic (e.g., software or firmware embedded within the source storage device 250a) for handling requests from a server (e.g., the source server 100a) to copy/write data to the source storage 200. The source storage device 250a may include the source storage 200 or a portion thereof.

For example, the source storage 200 may include a source memory 230. The source memory 230 may include, or may be, a long-term memory. For example, the source memory 230 may include a nonvolatile memory and/or a memory tier (including volatile and nonvolatile memory). The source memory 230 may correspond to long-term memory devices of one or more source storage devices 250a. For example, the source storage 200 may refer to a long-term memory made up of one or more source storage devices 250a of a distributed storage system, such as a virtualized distributed storage system. The source storage device 250a may be a solid-state drive (SSD) including one or more underlying source storage devices 250a. The underlying source storage devices may be virtual or physical. The source storage device 250a may be connected to the source storage 200 via a storage interface 22. The storage interface 22 may include, or may be, a flash interface (e.g., a NAND flash interface) or a remote interface, which may be implemented by way of ethernet.

The source host system 100S may include a source live migration server 100b. The source live migration server 100b may be a server that is assigned higher/additional privileges in comparison to the source server 100a or the target server 100c. The privileges may correspond to data access within the system 1. The source live migration server 100b may be assigned to manage a live migration operation (e.g., a live migration process) for copying data from the source storage 200 to the target storage 300. The source live migration server 100b may include a source live migration server memory 120b.

The source live migration server memory 120b may include, or may be, RAM (e.g., SRAM or DRAM). The source live migration server memory 120b may be used to store metadata for managing (e.g., monitoring and/or directing) the live migration operation. The source live migration server 100b may be connected to a source live migration storage device 250b via a communications link 20. The communications link 20 may include, or may be implemented by way of, a variety of technologies (e.g., PCIe, NVMe over PCIe, NVMe-oF, etc.).

The source live migration storage device 250b may be a storage device that is assigned higher/additional privileges in comparison to the source storage device 250a or the target storage device 250c. The assigned privileges may correspond to the access of data within the system 1. The source live migration storage device 250b may be assigned to assist in the live migration operation by reading data from the source storage 200.

The source live migration storage device 250b may include a source live migration controller memory 220b and a source live migration controller 210b.

The source live migration controller memory 220b may include, or may be, RAM (e.g., SRAM or DRAM). The source live migration controller memory 220b may be used to store metadata for managing (e.g., monitoring and/or directing) the live migration operation. The source live migration controller memory 220b may also include a live migration controller cache 222b for storing (e.g., temporarily storing) data from the source storage 200.

The source live migration controller 210b may include, or may be implemented by way of, embedded logic, which may be part of the source live migration storage device 250b, for assisting the source live migration server 100b in copying data from the source storage 200 to the target storage 300.

The source live migration storage device 250b may be connected to the source storage 200 via a storage interface 22. The storage interface 22 may include, or may be, a flash interface (e.g., a NAND flash interface) or a remote interface (e.g., implemented by way of ethernet).

The source live migration server 100b may be connected or linked to the target host system 100T via a live-migration-server-to-target link 10. The live-migration-server-to-target link 10 may be implemented by a variety of technologies depending on whether the system 1 is implemented via hardware (HW), software (SW), or a combination of HW and SW.

In addition to the target server 100c discussed above, the target host system 100T may include a target live migration server 100d. The target live migration server 100d may be a server that is assigned higher/additional privileges in comparison to the source server 100a or the target server 100c. The privileges may correspond to data access within the system 1. The target live migration server 100d may be assigned to assist the source live migration server 100b in managing the live migration operation. The target live migration server 100d may include a target live migration server memory 120d.

The target live migration server memory 120d may include, or may be, RAM (e.g., SRAM or DRAM). The target live migration server memory 120d may be used to store metadata for managing (e.g., monitoring and/or directing) the live migration operation. The target live migration server 100d may be connected to a target live migration storage device 250d via a communications link 20. The communications link 20 may include, or may be implemented by way of, a variety of technologies (e.g., PCIe, NVMe over PCIe, NVMe-oF, etc.).

The target live migration storage device 250d may be a storage device that is assigned higher/additional privileges in comparison to the source storage device 250a or the target storage device 250c. The assigned privileges may correspond to the access of data within the system 1. The target live migration storage device 250d may be assigned to assist in the live migration operation by writing data to the target storage 300 (e.g., data originating from the source storage 200).

The target live migration storage device 250d may include a target live migration controller memory 220d. The target live migration controller memory 220d may include, or may be, RAM (e.g., SRAM or DRAM). The target live migration controller memory 220d may be used to store metadata for managing (e.g., monitoring and/or directing) the live migration operation.

The target live migration storage device 250d may also include a target live migration controller 210d. The target live migration controller 210d may include, or may be implemented by way of, embedded logic, which may be part of the target live migration storage device 250d, for assisting the target live migration server 100d in writing data to the target storage 300. The target live migration storage device 250d may be connected to the target storage 300 via a storage interface 22. The storage interface 22 may include, or may be, a flash interface (e.g., a NAND flash interface) or a remote interface (e.g., implemented by way of ethernet).

The servers and storage devices of the system 1 may be implemented via HW, SW, or a combination of HW and SW. For example, in some embodiments, the live-migration-server-to-target link 10 may be a physical network connection (e.g., ethernet). In some embodiments, one or more of the servers (e.g., the source server 100a, the source live migration server 100b, the target live migration server 100d, or the target server 100c) may be software entities. For example, one or more of the servers may be virtual machines (VMs) managed by a hypervisor associated with one or more central processing units (CPUs).

Likewise, one or more of the storage devices 250a, 250b, 250c, 250d and/or the source storage 200 and/or the target storage 300 may be virtualized and implemented by way of HW and/or SW techniques. For example, one or more of the storage devices 250a, 250b, 250c, 250d and/or the source storage 200 and/or the target storage 300 may be provided by any combination of physical storage devices. In one or more embodiments, and as indicated by the dashed lines in FIG. 1, the source storage device 250a, the source live migration storage device 250b, and the source storage 200 may be components of a source SSD. Similarly, the target storage device 250c, the target live migration storage device 250d, and target storage 300 may be components of a target SSD. In one or more other embodiments, a migration may be from a first virtual machine to a second virtual machine, noting that both virtual machines may be supported by one physical storage device. In one or more embodiments, the source live migration server 100b and the target live migration server 100d may be the same. For example, a migration may be from a source live migration controller to a target live migration controller, or from a source namespace to a target namespace, within the same physical storage device. It should be understood that a variety of other combinations between, for example, physical and virtual devices may be implemented, and do not depart from the spirit and scope of the present disclosure.

The source live migration server 100b and the source live migration storage device 250b, together with the target live migration server 100d and the target live migration storage device 250d, may coordinate a management of a live migration process by communicating metadata that is indicative of a status of data corresponding to the LBAs in the source storage 200.

For example, during the live migration process, a region of the source storage may be gradually copied from the source storage 200 to the target storage 300 during a first iteration of copying. The region of the source storage 200 may correspond to one or more storage locations (e.g., LBAs or "pages") having data to be copied during the first iteration of copying. For example, during the first iteration of copying, the storage locations may be "mapped pages" containing "mapped data" to be copied from the source storage 200 to the target storage 300. The region of the source storage 200 may receive user data writes UDW, which may cause a change to data at one or more storage locations (e.g., LBAs or "pages") already copied from the source storage 200 to the target storage 300 for the live migration. As discussed above, such storage locations may be referred to as "dirty pages" containing "dirty data." The dirty data may be copied from the source storage 200 to the target storage 300, in a second iteration of copying, to keep the target storage 300 updated.

Referring still to FIG. 1, during the first iteration of copying, the source storage 200 may receive user data writes UDW to the following LBAs in the following order: LBA 0 at a first time (depicted as UDW1); LBAs 8-10 at a second time (depicted as UDW2); LBAs 14 and 15 at a third time (depicted as UDW3); LBA 2 at a fourth time (depicted as UDW4); and LBAs 7-9 at a fifth time (depicted as UDW5, and as UDW2,5 for overlapping user data writes to LBAs 8 and 9 at the second time and at the fifth time).

To keep track of the dirty pages (e.g., LBAs 0, 2, 7, 8-10, 14, and 15) that are to be copied during a second copying iteration of the live migration process, a live migration storage device 250b may track dirty page locations using a data structure DS in a first format (operation 1001). For example, the data structure DS may be provided in the form of a bitmap (see FIG. 3A) or in the form of a scatter-gather list (see FIG. 3B). Information from the data structure DS may be used to generate a read submission queue entry RSQE to enable the system 1 to read data from the source storage 200. The information from the data structure DS may also be used to generate a write submission queue entry WSQE to enable the system 1 to write the data to the target storage 300. The data structure DS may indicate the locations of mapped pages during the first iteration of copying for the live migration process. The data structure DS may indicate the locations of dirty pages during the second, or a later, iteration of copying for the live migration process.

In some systems 1, the source live migration storage device 250b may send the data structure DS to the source live migration server 100b to parse the data structure DS. The source live migration server 100b may create corresponding read submission queue entries RSQE (operation 1002). In some systems 1, the source live migration server 100b may also create a write submission queue WSQ, including write submission queue entries WSQE to instruct the target live migration server 100d and the target live migration storage device 250d how to write the data from the source storage 200 to the target storage 300.

The read submission queue entries RSQE may be sent from the source live migration server 100b to the source live migration storage device 250b (operation 1003). The read submission queue entries RSQE may include various fields (see FIG. 3C) with metadata that includes information to instruct the source live migration storage device 250b on how to read the data from the source storage 200 for copying the data from the source storage 200 to the target storage 300 (operations 1004-1007). For example, the source live migration storage device 250b may use the read submission queue entries RSQE to read dirty data or mapped data, depending on the iteration of copying, from the source storage 200 to the source live migration storage device 250b (operation 1004).

In some embodiments, the source live migration storage device 250b may create a data queue DQ at the source live migration storage device 250b (operation 1004). The data queue DQ may be stored (e.g., temporarily stored) in a source live migration storage device cache 222b (operation 1004). The source live migration server 100b may receive the data queue DQ from the source live migration storage device 250b (operation 1005). The source live migration server 100b may send the data queue DQ and the write submission queue WSQ to the target live migration server 100d (operation 1006).

The target live migration server 100d may send write submission queue entries WSQE to the target live migration storage device 250d to use in writing the data to target storage 300 (operation 1007). The write submission queue entries WSQE may include various fields (see FIG. 3D) with metadata that includes information to instruct the target live migration storage device 250d on how to write the data from the source storage 200 to the target storage 300. The fields of the read submission queue entries RSQE may largely parallel the fields of the write submission queue entries WSQE (e.g., compare FIG. 3C with FIG. 3D).

Figure 2:
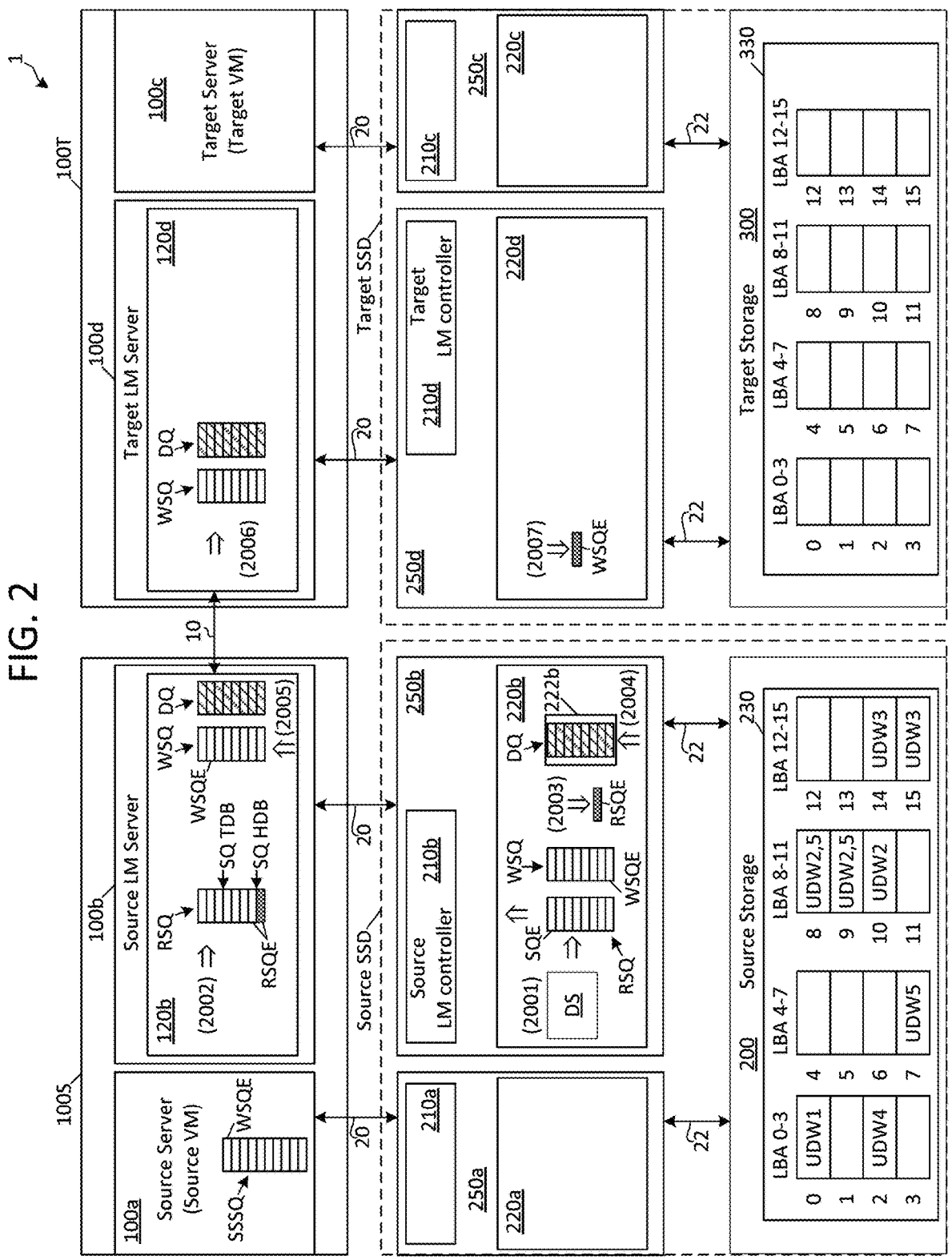
FIG. 2 is a system diagram depicting a system for managing a data migration using a live migration storage device to create submission queue entries, according to one or more embodiments of the present disclosure.

FIG. 2 is a system diagram depicting a system for managing a data migration using a live migration storage device to create submission queue entries, according to one or more embodiments of the present disclosure.

Referring to FIG. 2, in one or more embodiments, the source live migration storage device 250b may create the SQEs (e.g., RSQEs and/or WSQEs) instead of the source live migration server 100b creating the SQEs (operation 2001). Additionally, the live migration storage device 250b may prepopulate (e.g., may generate metadata in) one or more fields of the SQEs to remove from the source live migration server 100b the associated burden of processing, and to accelerate the live migration process.

In one or more embodiments, the source live migration storage device 250b may create read submission queue entries RSQE, may prepopulate some, or all, of the fields of the read submission queue entries RSQE, and may send the read submission queue entries RSQE to the source live migration server 100b. The source live migration server 100b may: (i) finish populating the fields of the read submission queue entries RSQE and (ii) add the read submission queue entries RSQE to a read submission queue RSQ (operation 2002). The source live migration server 100b may send a read command to the source live migration storage device 250b by way of a read submission queue entry RSQE (operation 2003). The source live migration storage device 250b may use the read submission queue entry RSQE to read corresponding data from the source storage 200 (operation 2004).

Alternatively, in one or more embodiments, the source live migration storage device 250b may read data from the source storage 200 based on a read submission queue entry RSQE created by the source live migration storage device 250b (operation 2003). For example, instead of sending a read submission queue entry RSQE to the source live migration server 100b and then waiting to receive a command from the source live migration server 100b (operations 2001, 2002, 2003, and 2004), the source live migration storage device 250b may have sufficient information from the read submission queue entry RSQE, which the source live migration storage device 250b created, to retrieve the data from the source storage 200 automatically (operations 2001, 2003, and 2004).

In one or more embodiments, instead of the source live migration storage device 250b creating the data structure DS in the form of a bitmap or in the form of a scatter-gather list, the source live migration storage device 250b may use a write submission queue entry WSQE corresponding to the source server submission queue SSSQ (and a corresponding user data write UDW) to generate read submission queue entries RSQE. For example, the source live migration storage device 250b may be configured to convert write submission queue entries WSQE, corresponding to dirty pages, to read submission queue entries RSQE. In other words, the source live migration storage device 250b may extract metadata from one or more fields of a write submission queue entry WSQE from the source server 100a and create a read submission queue entry RSQE based on the extracted metadata.

In one or more embodiments, the source live migration storage device 250b may store the dirty data or mapped data copied from the source storage 200 in a source live migration storage device cache 222b. For example, the source live migration storage device 250b may create a data queue DQ on the storage device 250b and may send the data queue DQ to the source live migration server 100b at a later time (e.g., asynchronously).

In one or more embodiments, the source live migration storage device 250b may store the dirty data or mapped data copied from the source storage 200 to a buffer on the source live migration server 100b. For example, the source live migration storage device 250b may send the data queue DQ to a buffer on the source live migration server 100b.

In one or more embodiments, the source live migration storage device 250b may also create write submission queue entries WSQE for processing by the target live migration server 100d or for processing by the target live migration storage device 250d in writing the data, which originated from the source storage 200, to the target storage 300 (operations 2004-2007).

Figure 3A:
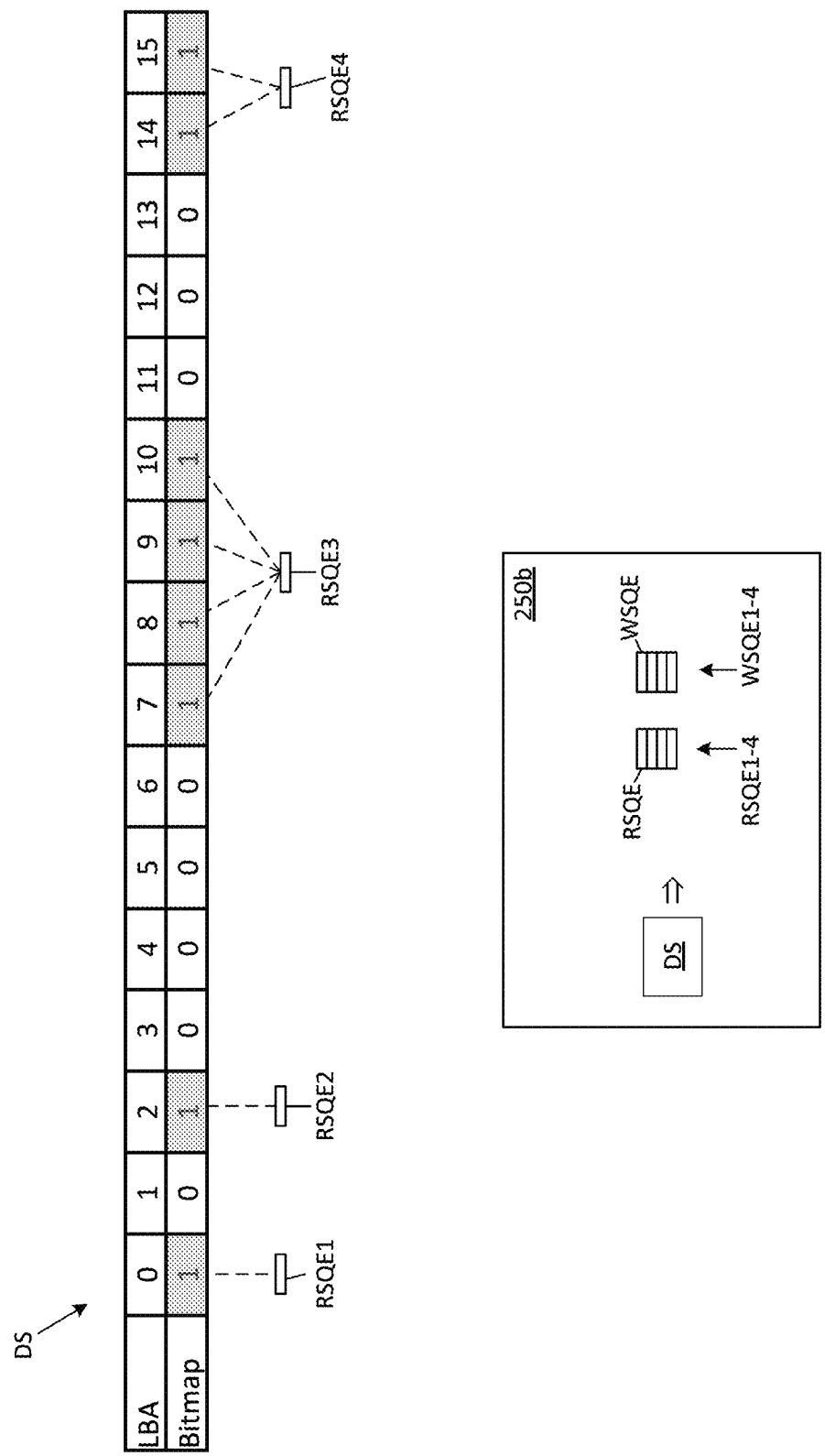
FIG. 3A is a diagram depicting a data structure that is a bitmap, according to one or more embodiments of the present disclosure.

FIG. 3A is a diagram depicting a data structure that is a bitmap, according to one or more embodiments of the present disclosure.

Referring to FIG. 3A, the data structure DS of FIGS. 1 and 2 may be created in the form of a bitmap with each LBA corresponding to a bit position within the bitmap. Dirty pages or mapped pages, depending on the iteration of copying, may be identified by "1" bits. For example, for dirty pages, the user data writes UDW discussed above may be depicted by 1's corresponding to LBAs 0, 2, 7-10, 14, and 15. For mapped pages, mapped pages may be depicted by 1's corresponding to LBAs 0, 2, 7-10, 14, and 15. In one or more embodiments, based on this simple example, the source live migration storage device 250b may create four read submission queue entries RSQE. For example: (i) a first read submission queue entry RSQE1 corresponding to LBA 0 may include a starting LBA (SLBA) field entry of 0 (e.g., SLBA=0) and a number of LBAs (NLBA) field entry of 0

(e.g., NLBA=0) (see FIGS. 3C and 3D); (ii) a second read submission queue entry RSQE2 corresponding to LBA 2 may include SLBA=2 and NLBA=0; (iii) a third read submission queue entry RSQE3 corresponding to LBAs 7-10 may include SLBA=7 and NLBA=3; and (iv) a fourth read submission queue entry RSQE4 corresponding to LBAs 14 and 15 may include SLBA=14 and NLBA=1.

Accordingly, the source live migration storage device 250*b* may be configured to convert a data structure DS that is a bitmap into one or more prepopulated SQEs (e.g., one or more read submission queue entries (RSQE) or one or more write submission queue entries (WSQE)). In one or more embodiments, the SQEs may be provided to the source live migration server 100*b* in a data buffer, in a manner similar to how read data or bitmap data may be returned to the source live migration server 100*b*. Optionally, SQEs may be inserted into a submission queue that is selected by the source live migration server 100*b*.

FIG. 3B is a diagram depicting a data structure that is a scatter-gather list, according to one or more embodiments of the present disclosure.

Referring to FIG. 3B, the data structure DS of FIGS. 1 and 2 may be created in the form of a scatter-gather list with each user data write UDW or mapped page, depending on the iteration of copying, being indicated as an entry in the list (e.g., in the log). For example, the scatter-gather list may include five log entries corresponding to the user data writes UDW or mapped pages discussed above corresponding to LBAs 0, 2, 7-10, 14, and 15. As discussed above, for dirty pages, the user data writes UDW may have occurred in the following sequence: LBA 0 at a first time (depicted as UDW1); LBAs 8-10 at a second time (depicted as UDW2); LBAs 14 and 15 at a third time; LBA 2 at a fourth time; and LBAs 7-9 at a fifth time.

In one or more embodiments, based on this simple example, the source live migration storage device 250*b* may create five read submission queue entries RSQE. For example: (i) a first read submission queue entry RSQE1 corresponding to LBA 0 may include a starting LBA (SLBA) field entry of 0 (e.g., SLBA=0) and a number of LBAs (NLBA) field entry of 0 (e.g., NLBA=0) (see FIGS. 3C and 3D); (ii) a second read submission queue entry RSQE2 corresponding to LBAs 8-10 may include SLBA=8 and NLBA=2; (iii) a third read submission queue entry RSQE3 corresponding to LBAs 14 and 15 may include SLBA=14 and NLBA=1; (iv) a fourth read submission queue entry RSQE4 corresponding to LBA 2 may include SLBA=2 and NLBA=0; and (iv) a fifth read submission queue entry RSQE5 corresponding to LBAs 7-9 may include SLBA=7 and NLBA=2.

Accordingly, the source live migration storage device 250*b* may be configured to convert a data structure DS that is a scatter-gather list into one or more prepopulated SQEs (e.g., one or more read submission queue entries (RSQE) or one or more write submission queue entries (WSQE)).

In one or more embodiments, the source live migration storage device 250*b* may be configured to combine the second read submission queue entry RSQE2 and the fifth read submission queue entry RSQE5 if overlap detection is enabled. For example, if overlap detection is enabled, the source live migration storage device 250*b* may be configured to create a read submission queue entry including SLBA=7 and NLBA=3 corresponding to LBAs 7-10.

In one or more embodiments, the submission queue entries SQEs may be provided to the source live migration server 100*b* in a data buffer, like command data. Alternatively, in one or more embodiments, the submission queue entries SQEs may be placed in the log instead of the log entries. Alternatively, in one or more embodiments, the submission queue entries SQEs may be inserted into a submission queue selected by the source live migration server 100*b*. For example, the source live migration server 100*b* may select a submission queue specifically designated for such submission queue entries. For example, the source live migration server 100*b* may select a read submission queue for the read SQEs and a write submission queue for the write SQEs, such that the read SQEs and the write SQEs are organized in separate submission queues. In one or more embodiments, the source live migration server 100*b* may choose to examine and/or alter the submission queue entries. In one or more embodiments, the source live migration server 100*b* may choose when to submit doorbell updates (e.g., notifications to the source live migration storage device 250*b* that indicate that a new SQE has been added to the submission queue for processing).

FIG. 3C is a diagram depicting fields of a read submission queue entry, according to one or more embodiments of the present disclosure, and FIG. 3D is a diagram depicting fields of a write submission queue entry, according to one or more embodiments of the present disclosure.

Referring to FIGS. 3C and 3D, as discussed above, the source live migration storage device 250*b* may construct (e.g., create) the SQEs for the read commands (or write commands) in whole or in part for the source live migration server 100*b*. The SQEs may be formatted in accordance an NVMe protocol. The operation code (OpCode) may be 02 h for Reads and may be 01 h for Writes. Thus, the OpCode field may be prepopulated based on the type of command. If the source live migration server 100*b* provides a buffer space, the source live migration storage device 250*b* may fill out the data pointers for the metadata pointer MD field, the physical region page entry 1 (PRP1) field or scatter gather lists entry 1 (SGL1) field, and physical region page entry 2 (PRP2) field or scatter gather lists entry 2 (SGL2) field. These prepopulating operations, which are performed by the source live migration storage device 250*b*, may be performed for Reads, Writes, Write Uncorrectable, Write Zeroes, and Copy Commands. In other words, prepopulation may not limited to just Reads and Writes.

In one or more embodiments, the following fields, and other unlisted fields, may be set to OFF, or, alternatively, the source live migration server 100*b* may initialize preferences for these fields: Force Unit Access (FUA); Limited Retry (LR); Fused; and Dataset Management.

In one or more embodiments, the following fields, and other unlisted fields, may be copied from Write commands, or the host may initialize preferences for these fields: Namespace Identifier (NSID); PRP/SGL; Expected Logical Block Storage Tag (ELBST)/Expected Initial Logical Block Reference Tag (EILBRT); Expected Logical Block Application Tag (ELBAT); Expected Logical Block Application Tag Mask (ELBATM); storage tag check (STC); and Protection Information Field (PRINFO).

While specific field examples are discussed above, the present disclosure is not limited thereto. For example, different combinations of fields, including the fields discussed above and/or other fields may be set to OFF, initialized to a preference, or copied from Write commands.

In one or more embodiments, the command identifier (Cmd ID) field may be left to be filled by the source live migration server 100*b*. Alternatively, the source live migration server 100*b* may allocate a pool of command identifiers for the source live migration storage device 250*b* to use.

Figure 4:
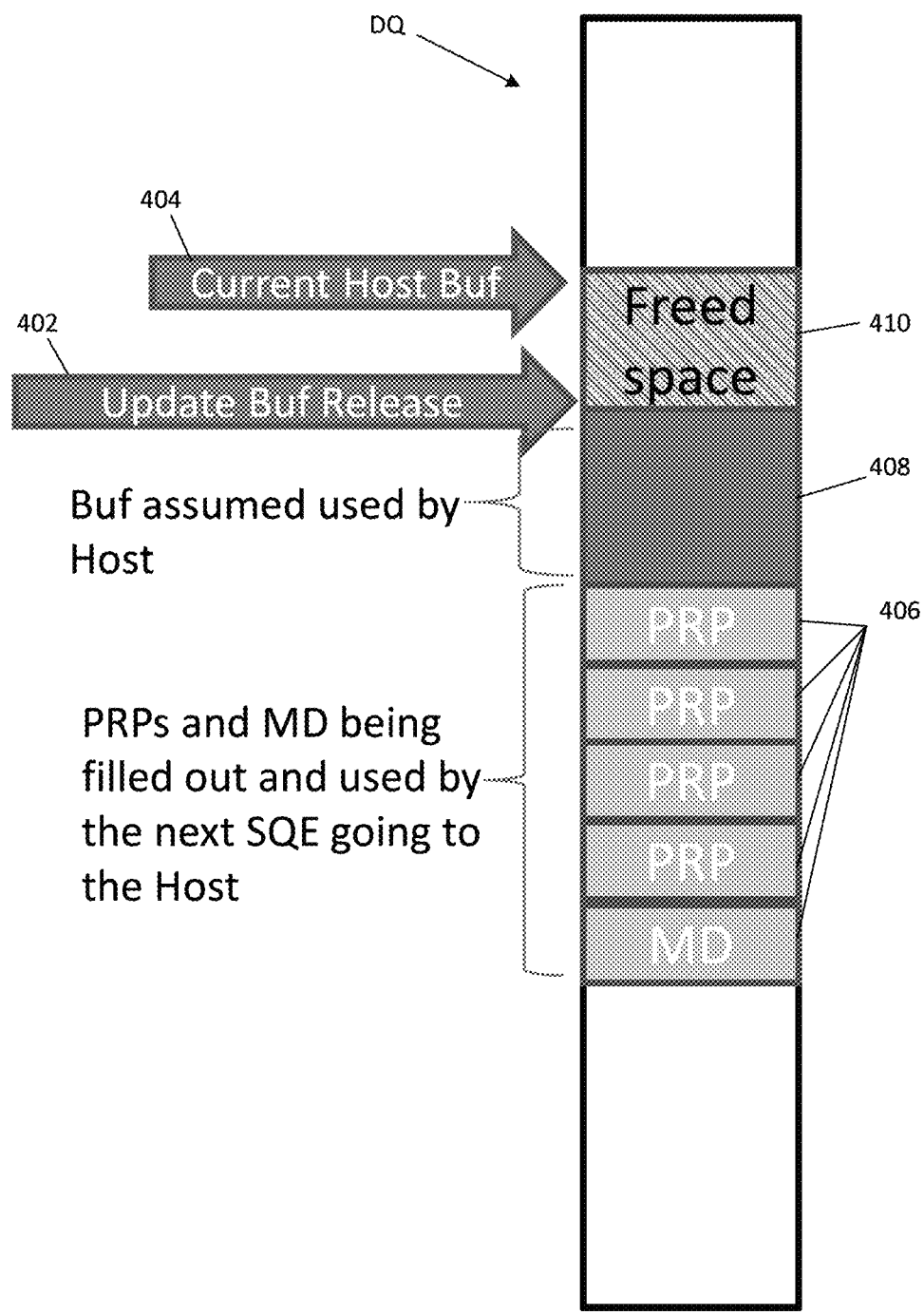
FIG. 4 is an example data queue, according to one or more embodiments of the present disclosure.

FIG. 4 is an example data queue, according to one or more embodiments of the present disclosure.

Referring to FIG. 4, in one or more embodiments, the SQE fields, from FIGS. 3C and 3D, called PRP1, PRP2, SGL1, SGL2, and MD may be left for the source live migration server 100b to populate. Alternatively, the source live migration server 100b may allocate a data queue DQ in the source live migration server memory 120b. In one or more embodiments, the source live migration storage device 250b may allocate memory space in the data queue DQ. The data for a read operation of the live migration process may be placed in the data queue DQ, and metadata describing where to find the data may be provided in the PRP, SGL, and MD fields of a read SQE for the read. If the data for the read is larger than can be described in the read SQE, the source live migration storage device 250b (see FIG. 2) may create extended PRP and SGL structures (e.g., additional PRP and SGL structures). The PRP and SGL regions of the read SQE for the read may be populated with metadata pointing to the extended PRP and SGL regions on the data queue DQ. Thus, the extended PRP and SGL regions and the associated data for all PRP and SGL regions may all be allocated out of the data queue DQ area allocated by the source live migration server 100b. FIG. 4 depicts one implementation method of the source live migration storage device 250b managing the data queue DQ area in a circular first-in, first-out (FIFO) fashion. As more existing memory space is used, the source live migration storage device 250b may place (e.g., allocate) more memory space on the end of the data queue DQ. The source live migration server 100b may be responsible for communicating to the source live migration storage device 250b when regions of the data queue DQ are not being used anymore. For example, the source live migration server 100b may copy the data queue DQ from the source live migration server 100b to the target live migration server 100d prior to releasing the data queue DQ back to the source live migration storage device 250b. For example, a first region 406 of the data queue DQ may include PRPs and an MD being filled out and used by a next SQE to be sent to the target live migration server 100d; a second region 408 of the data queue DQ may be in use by the source live migration server 100b for copying to the target live migration server 100d; and a third region 410 corresponding to a first-in portion 404 of the data queue DQ and an update buffer release portion 402 of the data queue 402 may be identified as freed space and, thus, allocated to the end of the data queue DQ by the source live migration storage device 250b. In one or more embodiments, the source live migration server 100b may return memory space on the data queue DQ to the source live migration storage device 250b through a PCIe-register write or an administration command.

Similarly, command identifiers consumed by the source live migration storage device 250b may be reused by the source live migration storage device 250b for new SQE formation. For example, the source live migration storage device 250b may receive a command identifier corresponding to a read SQE from the source live migration server 100b. The live migration storage device 250b may read data from the source storage 200 identified by the read SQE. The live migration storage device 250b may complete the read SQE by writing the data corresponding to the read SQE into the data queue DQ and form a write SQE using the command identifier corresponding to the read SQE. Accordingly, a completion time for fulfilling the read command and forming a corresponding write SQE may be reduced (e.g., completion time may be zero) by the live migration storage device 250b reusing the command identifier to create the write SQE.

In one or more embodiments, one or more memory locations of the source live migration server memory 120b (see FIG. 2) corresponding to the various queues discussed above may be contiguous. For example, the read submission queue RSQ may include RSQEs arranged in contiguous memory locations; the write submission queue WSQ may include WSQEs arranged in contiguous memory locations; and/or the data queue DQ may include data queue entries (DQE) arranged in contiguous memory locations. Alternatively, in one or more embodiments, one or more memory locations of the source live migration server memory 120b (see FIG. 2) corresponding to the various queues (e.g., RSQ, WSQ, and DQ) discussed above may not be contiguous (e.g., may be separated by intervening memory locations). For example, instead of the 20 memory locations being allocated in a contiguous range of 33-52, the 20 memory locations may be allocated in a non-contiguous range of 20-29 and 34-44. The 20 memory locations could also be arranged out of order. For example, 10 memory locations 35-44 may be arranged before the remaining 10 memory locations 20-29. In such embodiments, the source live migration server 100b may communicate which data queue DQ regions are done by sending a completion communication to the source live migration storage device 250b. The live migration storage device 250b may track gaps between the data queue DQ regions based on the completion communication.

FIG. 5 is a flowchart depicting example operations of methods for managing a data migration using a live migration storage device to create submission queue entries, according to one or more embodiments of the present disclosure.

Referring to FIG. 5, a method 5000 may include one or more of the following operations. A source live migration storage device 250b (see FIG. 2) may create a read submission queue entry RSQE based a data structure DS that is a bitmap, a scatter-gather list, or a write submission queue entry, and that indicates a location (e.g., an LBA) of data at a source storage 200 to be copied from the source storage 200 to a target storage 300 (operation 5001). The source live migration storage device 250b may create (e.g., generate) metadata, in a field of the read submission queue entry, the metadata including information for reading the data from the source storage (operation 5002). The source live migration storage device 250b may copy the data from the source storage 200 to a cache 222b of the source live migration storage device 250b, or may cause the data to be stored on a source live migration server 100b (e.g., a host) (operation 5003). The source live migration storage device 250b may create a write submission queue entry WSQE for processing by a target live migration server 100d or by a target live migration storage device 250d (operation 5004). It should be understood that the data to be copied from the source storage 200 to the target storage 300 may be mapped data or dirty data, depending on an iteration of copying. For example, mapped data would be copied in a first (or an initial) iteration of copying in a live migration process, while dirty data would be copied in a second (or each subsequent) iteration of copying in the live migration process.

As used herein, when a "data structure" is described as "indicating" a location of data, it may mean that an element of the data structure (e.g., a bit of a bitmap, if the data structure is or includes a bitmap) points to, or indicates, the location of the data.

Accordingly, embodiments of the present disclosure provide improvements and advantages to the communication of metadata for managing (e.g., performing) a data migration (e.g., a live migration). By prepopulating commands, a live migration process may be accelerated by performing tasks at a storage device (e.g., a live migration storage device) that might otherwise be performed by a host (e.g., a live migration server).

Example embodiments of the disclosure may extend to the following statements, without limitation:

Statement 1. An example method includes creating, by a storage device, a read submission queue entry indicating a location of data at a source storage of the storage device to be copied from the source storage to a target storage, the read submission queue entry including a field including metadata including information for reading the data from the source storage.

Statement 2. An example method includes the method of statement 1, further including sending, by the storage device, the read submission queue entry to a host, receiving, by the storage device, a command based on the read submission queue entry, and reading, by the storage device, the data from the source storage based on the command.

Statement 3. An example method includes the method of any one of statements 1 and 2, further including reading the data from the source storage based on the read submission queue entry being stored on the storage device.

Statement 4. An example method includes the method of any one of statements 1-3, wherein the read submission queue entry is one entry of multiple entries of the read submission queue entry, and the entries include information for reading the data from the source storage.

Statement 5. An example method includes the method of any one of statements 1-4, wherein the metadata includes a data pointer or a command identifier.

Statement 6. An example method includes the method of any one of statements 1-5, wherein the read submission queue entry is created using information from a write submission queue entry corresponding to a user data write.

Statement 7. An example method includes the method of any one of statements 1-5, further including generating a scatter-gather list or a bitmap based on a user data write received in the source storage, wherein the read submission queue entry is created based on the scatter-gather list or the bitmap.

Statement 8. An example method includes the method of any one of statements 1-7, further including copying, by the storage device, the data from the source storage to a cache of the storage device, or causing the data to be stored on a host.

Statement 9. An example method includes the method of any one of statements 1-8, further including creating, by the storage device, a write submission queue entry for processing by a target live migration server or by a target live migration storage device.

Statement 10. An example device for performing the method of any of statements 1-9 includes a controller and a memory.

Statement 11. An example system for performing the method of any of statements 1-9 includes a host and a storage device.

While embodiments of the present disclosure have been particularly shown and described with reference to the embodiments described herein, it will be understood by those of ordinary skill in the art that various changes in form and details may be made therein without departing from the spirit and scope of the present disclosure as set forth in the following claims and their equivalents.

What is claimed is:

1. A method for managing a data migration operation, the method comprising
based on determining that a location of data at a source storage is updated due to a data write, creating, by a storage device, a read submission queue entry indicating the location of the data at the source storage of the storage device to be copied from the source storage to a target storage, the read submission queue entry comprising:
a first field comprising first information for reading the data from the source storage, the first information originating from the storage device; and
a second field comprising second information for reading the data from the source storage.

2. The method of claim 1, further comprising:
sending, by the storage device, the read submission queue entry to a host;
receiving, by the storage device, a command based on the read submission queue entry; and
reading, by the storage device, the data from the source storage based on the command.

3. The method of claim 1, further comprising reading the data from the source storage based on the read submission queue entry being stored on the storage device.

4. The method of claim 1, wherein the first information comprises a data pointer or a command identifier.

5. The method of claim 1, wherein the read submission queue entry is created using information from a write submission queue entry corresponding to the data write.

6. The method of claim 1, further comprising generating a scatter-gather list or a bitmap based on the data write,
wherein the read submission queue entry is created based on the scatter-gather list or the bitmap.

7. The method of claim 1, further comprising:
copying, by the storage device, the data from the source storage to a cache of the storage device; or
causing the data to be stored on a host.

8. The method of claim 1, further comprising creating, by the storage device, a write submission queue entry for processing by a target live migration server or by a target live migration storage device.

9. A storage device for managing a data migration operation, the storage device being configured to:
based on determining that a location of data at a source storage is updated due to a data write, create a read submission queue entry indicating the location of the data at the source storage of the storage device to be copied from the source storage to a target storage, the read submission queue entry comprising:
a first field comprising first information for reading the data from the source storage, the first information originating from the storage device; and
a second field comprising second information for reading the data from the source storage.

10. The storage device of claim 9, wherein the first information comprises a data pointer or a command identifier.

11. The storage device of claim 9, wherein the read submission queue entry is created using information from a write submission queue entry corresponding to the data write.

12. The storage device of claim 9, wherein the storage device is configured to:
   generate a scatter-gather list or a bitmap based on the data write received in the source storage; and
   create the read submission queue entry based on the scatter-gather list or the bitmap.

13. The storage device of claim 9, configured to create a write submission queue entry for processing by a target live migration server or by a target live migration storage device.

14. A system for managing a data migration operation, the system comprising:
   a host; and
   a storage device,
   wherein the storage device is configured to:
   based on determining that a location of data at a source storage is updated due to a data write, create a read submission queue entry indicating the location of the data at the source storage of the storage device to be copied from the source storage to a target storage, the read submission queue entry comprising:
      a first field comprising first information for reading the data from the source storage, the first information originating from the storage device; and
      a second field comprising second information for reading the data from the source storage.

15. The system of claim 14, wherein the storage device is configured to:
   send the read submission queue entry to the host;
   receive a command based on the read submission queue entry; and
   read the data from the source storage based on the command.

16. The system of claim 14, wherein the storage device is configured to read the data from the source storage based on the read submission queue entry being stored on the storage device.

17. The system of claim 14, wherein the read submission queue entry is created using information from a write submission queue entry corresponding to the data write.

18. The system of claim 14, wherein the storage device is configured to create a write submission queue entry for processing by a target live migration server or by a target live migration storage device.

* * * * *